United States Patent
Andrews (10) Patent No.: US 12,175,612 B2
(45) Date of Patent: Dec. 24, 2024

(54) MIXED REALITY ENVIRONMENT DISPLAY USING SURFACE RECONSTRUCTION MESH AND LIVE VIDEO OVERLAY

(71) Applicant: Microsoft Technology Licensing, LLC, Redmond, WA (US)

(72) Inventor: Benjamin James Andrews, Seattle, WA (US)

(73) Assignee: Microsoft Technology Licensing, LLC., Redmond, WA (US)

( * ) Notice: Subject to any disclaimer, the term of this patent is extended or adjusted under 35 U.S.C. 154(b) by 93 days.

(21) Appl. No.: 18/059,957

(22) Filed: Nov. 29, 2022

(65) Prior Publication Data

US 2023/0260221 A1 Aug. 17, 2023

Related U.S. Application Data

(60) Provisional application No. 63/310,856, filed on Feb. 16, 2022.

(51) Int. Cl.
*G06T 19/00* (2011.01)
*H04N 21/2187* (2011.01)

(52) U.S. Cl.
CPC ....... *G06T 19/006* (2013.01); *H04N 21/2187* (2013.01); *G06T 2219/024* (2013.01)

(58) Field of Classification Search
None
See application file for complete search history.

(56) References Cited

U.S. PATENT DOCUMENTS

| 10,360,718 | B2 | 7/2019 | Chernov et al. |
| 2014/0160251 | A1* | 6/2014 | Halamish .............. G06T 19/006 348/47 |
| 2015/0002507 | A1 | 1/2015 | Tomlin et al. |
| 2018/0140362 | A1 | 5/2018 | Cal et al. |
| 2018/0144547 | A1 | 5/2018 | Shakib et al. |
| 2019/0088016 | A1 | 3/2019 | Tadros et al. |
| 2019/0370544 | A1* | 12/2019 | Wright, Jr. ............. G06Q 10/20 |

(Continued)

OTHER PUBLICATIONS

"Achieve Optical and Camera See-through Solutions with the X2 MR Glasses", Retrieved From: https://medium.com/@thirdeyegen/achieve-optical-and-camera-see-through-solutions-with-the-x2-mr-glasses-d4af0317ab83, Feb. 21, 2020, 3 Pages.

(Continued)

*Primary Examiner* — Frank S Chen
(74) *Attorney, Agent, or Firm* — Foley IP Law, PLLC (57) ABSTRACT

The disclosure herein describes enabling a user of a remote mixed reality (MR) device to observe an environment of a local MR device combined with 3D surface reconstruction (SR) mesh data and live video data. Optical data of a surface of an environment is obtained and a 3D surface reconstruction mesh of the surface is generated from the obtained optical data using photogrammetry. The generated 3D surface reconstruction mesh is provided for display by a remote device. A live video feed of a window region of the environment is obtained and the live video feed of the window region is provided for display on the generated 3D surface reconstruction mesh by the remote device. Further, a remote user is enabled to provide feedback to a user of the local MR device, including audio feedback such as speech and virtual artifacts that are displayed to the local user.

20 Claims, 6 Drawing Sheets

(56) References Cited

U.S. PATENT DOCUMENTS

| | | |
|---|---|---|
| 2019/0371060 A1 | 12/2019 | Energin et al. |
| 2020/0242835 A1* | 7/2020 | Cherukuri ............. G06T 19/006 |
| 2020/0258300 A1 | 8/2020 | Schwarz et al. |
| 2021/0015583 A1 | 1/2021 | Avisar et al. |
| 2021/0137634 A1 | 5/2021 | Lang |
| 2021/0191514 A1 | 6/2021 | Zahirovic |
| 2021/0358143 A1* | 11/2021 | Avisar ..................... G06T 7/251 |
| 2023/0245192 A1* | 8/2023 | Zaki .................. G06Q 30/0643 |
| | | 705/26.5 |

OTHER PUBLICATIONS

"What is Mixed Reality—How is it Different from VR and AR?", Retrieved From: https://web.archive.org/web/20210116203149/https:/virsabi.com/mixed-reality/, Jan. 16, 2021, 4 Pages.

Teo, et al., "Mixed Reality Remote Collaboration Combining 360 Video and 3D Reconstruction", In Proceedings of the CHI Conference on Human Factors in Computing Systems, May 4, 2019, 14 Pages.

"International Search Report and Written Opinion Issued in PCT Application No. PCT/US22/053907", Mailed Date: Apr. 17, 2023, 13 Pages.

\* cited by examiner

MIXED REALITY ENVIRONMENT DISPLAY USING SURFACE RECONSTRUCTION MESH AND LIVE VIDEO OVERLAY

CROSS-REFERENCE TO RELATED APPLICATION

This application claims priority to U.S. Provisional Patent Application No. 63/310,856, entitled "MIXED REALITY ENVIRONMENT DISPLAY USING SURFACE RECONSTRUCTION MESH AND LIVE VIDEO OVERLAY," filed on Feb. 16, 2022, the disclosure of which is incorporated herein by reference in its entirety.

BACKGROUND

In modern operating rooms and other medical settings, video of procedures can be captured and reviewed by experts who can then provide feedback, enabling the performers of the procedures to improve. However, static video feeds of procedures are limited in that the reviewing expert has limited or no capability to alter the field of view or observe other contextual information that is not in the field of view.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A computerized method for enabling a user of a remote mixed reality (MR) device to observe an environment of a local MR device combined with 3D surface reconstruction (SR) mesh data and live video data is described. Optical data of a surface of an environment is obtained and a 3D surface reconstruction mesh of the surface is generated from the obtained optical data using photogrammetry. The generated 3D surface reconstruction mesh is provided for display by a remote device. A live video feed of a window region of the environment is obtained and the live video feed of the window region is provided for display on the generated 3D surface reconstruction mesh by the remote device.

BRIEF DESCRIPTION OF THE DRAWINGS

The present description will be better understood from the following detailed description read in light of the accompanying drawings, wherein:

Corresponding reference characters indicate corresponding parts throughout the drawings. In FIGS. 1 to 6, the systems are illustrated as schematic drawings. The drawings may not be to scale.

DETAILED DESCRIPTION

Aspects of the disclosure provide a computerized method and system for enabling a user of a remote mixed reality (MR) device to observe an environment of a local MR device combined with 3D surface reconstruction (SR) mesh data and live video data. The remote user is further enabled to provide feedback to a user of the local MR device, including audio-based feedback such as speech and virtual or holographic artifacts that are displayed to the local user via the local MR device as described here. Such a system can be used in a medical setting, such as an operating room, wherein a remote observer of an operation is enabled to closely observe and provide guidance to a local surgeon. The system is also of use in other settings, such as a local user receiving instructions on how to perform mechanical repair tasks from a remote expert, or a class of remote students are taught by a local teacher using a synchronized 3D environment featuring live video of a chemistry experiment or other teaching aid. The disclosure includes obtaining the 3D SR mesh data of an environment and sending it to a remote device, where it can be used to generate a virtual environment that matches the local environment. Further, live video is captured locally of a particular window region of the environment. The live video is also provided to the remote device, enabling a user thereof to directly observe what is happening in the window region in the context of the rest of the generated virtual environment.

The disclosure operates in an unconventional manner at least by combining the use SR mesh data and photogrammetry techniques to generate a 3D space that closely matches the local environment and then overlaying live video feed of a portion of the local environment on the generated 3D space. Such a hybrid virtual reality (VR) experience enables the remote observer to be fully immersed in the setting, despite being far away. Further, the live video feed provides 3D data, enabling the live video feed to be closely fitted to the 3D SR mesh of the virtual environment, rather than just displaying a two-dimensional video.

These features improve the user experience of being a remote user in comparison to other systems that merely provide a flat, screen-based experience (e.g., as is currently provided by MICROSOFT Remote Assist).

Figure 1:
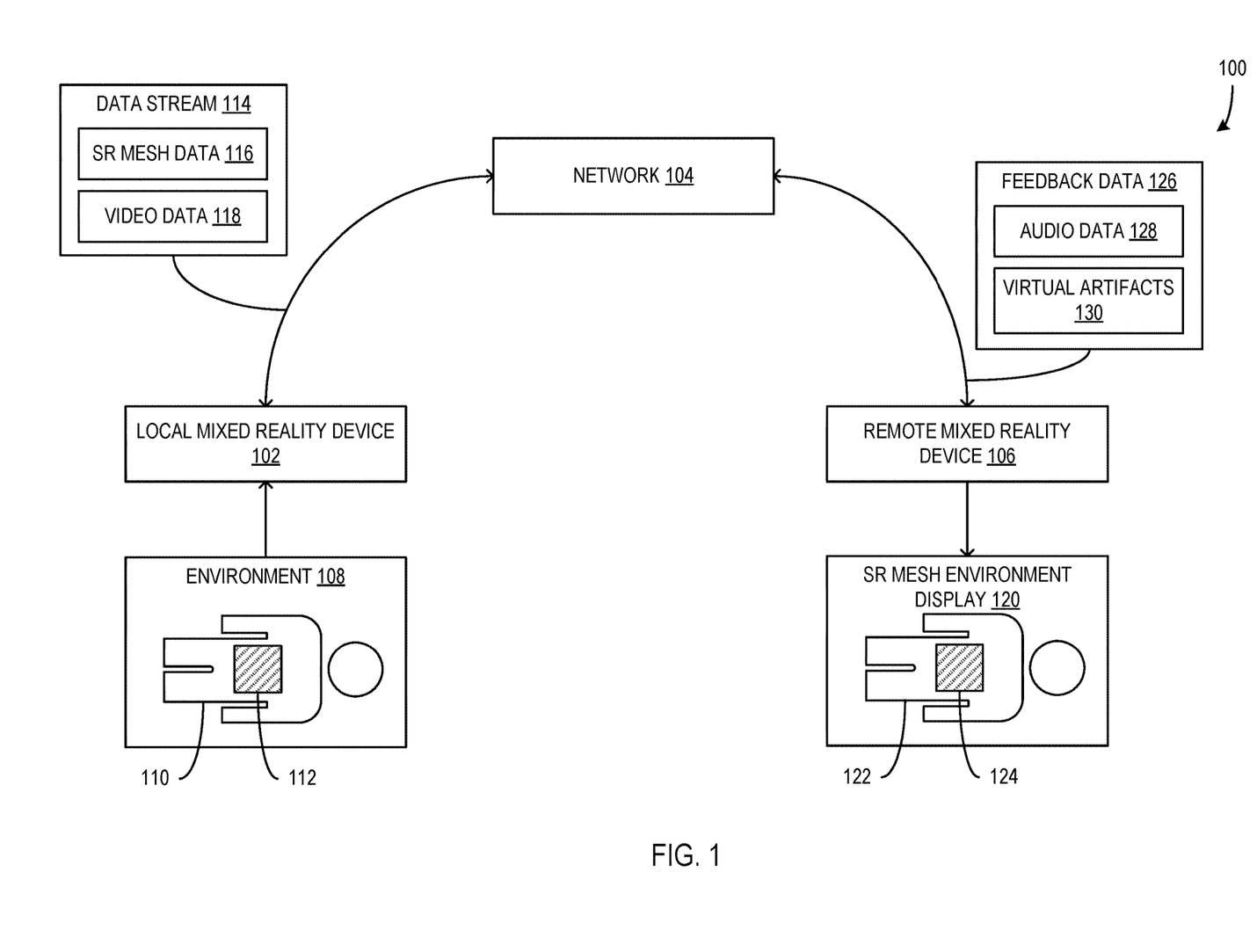
FIG. 1 is a block diagram illustrating a system configured to provide a live video data stream to a remote device to enable observation of an environment by a user in a remote location.

FIG. 1 is a block diagram illustrating a system 100 configured to provide a live video data stream 118 to a remote device 106 to enable observation of an environment 108 by a user in a remote location. The local mixed reality (MR) device 102 captures or otherwise obtains optical data of the environment 108 and streams the obtained data via a network 104 to the remote MR device 106, which uses the streamed data to display a surface reconstruction (SR) mesh environment display 120 to a user of the remote MR device 106.

The local MR device 102 includes hardware, firmware, and/or software configured to display MR visualizations to a user and/or enable the user to interact with the displayed MR visualizations. In some examples, the local MR device 102 is configured to operate as a virtual reality (VR) device and/or an augmented reality (AR) device. For instance, in some such examples, the device 102 includes MR googles, glasses, and/or other headgear configured to overlay MR artifacts and/or holograms on the user's field of vision. MR artifacts include colors, shapes, words, numbers, or other visualizations. For instance, in an example, an MR artifact of an arrow is overlaid on the user's field of vision to draw the user's attention to a particular position in the environment 108.

Further, in some examples, the device 102 includes a camera or other optical capture interface or device. The optical capture interface captures optical data associated with at least a portion of the user's field of vision. For instance, the optical capture interface captures optical data representative of the region in the environment 108 at which the user is looking (e.g., a window region 112). Additionally, in some such examples, the device 102 includes depth sensors that enable the device to capture depth of field information associated with the optical data being captured. In such examples, the depth of field information is used by the device 102 to identify relative positions of surfaces and to generate the SR mesh data as described herein.

Additionally, or alternatively, the device 102 includes components for detecting the position, orientation, and/or movement of the device 102. For instance, the device 102 includes one or more accelerometers that detect movement of the device 102 and a component that uses detected movement data to track the position of the device 102 in space of the environment 108.

The remote MR device 106 includes hardware, firmware, and/or software configured in the same way as the local MR device 102 as described above. In some examples, the device 106 is configured to display the SR mesh data 116 in the form of the SR mesh environment display 120 and to display the video data 118 of the data stream 114 in the form of a live video feed in the window region 124 that is imposed on the SR patient mesh 122 of the environment display 120. In some such examples, the device 106 includes a screen or other visualization user interface for displaying the environment display 120 and the associated SR patient mesh 122 and live feed window region 124. Alternatively, or additionally, the device 106 includes goggles, glasses, and/or other headgear configured to overlay MR artifacts and/or holograms over the user's field of vision, as described above with respect to local MR device 102.

Further, in some examples, the device 106 includes components for detecting the position, orientation, and/or movement of the device 106. For instance, the device 106 includes one or more accelerometers that detect movement of the device 106 and a component that uses detected movement data to track the position of the device 106 in reference to the virtual space of the environment display 120.

The network 104 includes hardware, firmware, and/or software for receiving data from, routing data between, and/or providing data to devices 102 and 106 and/or other devices connected to the network. In some examples, the network 104 includes an intranet, the Internet, and/or the like. In such an example, the device 102 sends data of the data stream 114 via the network 104 to the device 106. Further, the device 106 sends feedback data 126 to the device 102 via the network 104. Additionally, or alternatively, the devices 102 and 106 communicate in other ways over the network 104 without departing from the description.

In some examples, the network 104 is an intranet and the devices 102 and 106 are in the same building and/or on the same hospital grounds or campus. Alternatively, the network 104 includes the Internet or other long-range network and the devices 102 and 106 are in different geographic locations.

In some examples, the environment 108 includes a plurality of different surfaces (e.g., walls, floors, ceilings, tables, furniture, people). For instance, in some such examples, the environment 108 includes an operating room that includes furniture such as an operating table, machinery or other devices used during surgeries, and/or a patient 110 upon which a surgery is being performed. The positions of surfaces in the environment 108 are captured using optical capture devices such as the local MR device 102 as described herein. For instance, the shape and location of the surfaces of the patient 110 are captured in reference to other surfaces of the environment 108. In some such examples, capturing optical data associated with the environment 108 includes capturing location of surfaces, position of surfaces, texture of surfaces, colors of surfaces, photogrammetry data of surfaces, or the like.

In some examples, the patient 110 and window region 112 are positioned in the environment 108. In some such examples, a surgery, operation, or the like is to be performed on the patient 110 and the patient 110 tends to remain still throughout the operation or process. When the patient 110 is in place in the environment 108, the optical data associated with the surfaces of the patient 110 are captured by the local MR device 102 and/or other optical capture devices as described herein. In some such examples, portions of the patient 110 outside of the operating region are covered (e.g., with sheets of material) and capturing the optical data of the surfaces of the patient 110 includes capturing the surfaces of the those covered regions.

The window region 112 in the environment is defined as the region of which live video data 118 is captured and provided to the remote MR device 106. In some examples, the window region 112 is a static region defined with respect to the region of the patient 110 where the operation is being performed. Alternatively, in other examples, window region 112 is dynamic and the position of the region 112 can be adjusted by a user of the local MR device 102, a user of the remote MR device 106, and/or another party or entity.

Further, in some examples, the position of the window region 112 is highlighted or otherwise indicated to a user of the local MR device 102 and/or a user of the remote MR device 106. For instance, the position of the window region 112 is indicated to a user of the local MR device 102 using a virtual artifact box or other shape overlayed on the user's field of vision. Additionally, or alternatively, the user is guided to direct their field of vision to the window region 112 using arrow artifacts or other indicators overlayed on their field of vision.

Additionally, or alternatively, the position of the window region 112 is highlighted or otherwise indicated to a user of the remote MR device 106 by displaying indicators to the user in a visual interface such as goggles, glasses, or a screen. In some such examples, the indicators include some or all the indicators described above with respect to the window region indicators of the local MR device 102.

In some examples, the window region 112 includes fields of vision of multiple optical capture devices, enabling a user of the remote MR device 106 to view a large region of the patient 110. In some such examples, the captured fields of vision of the multiple optical capture devices are combined in such a way that the vision of the user of the remote MR device 106 can switch substantially seamlessly between fields of vision when observing the virtual SR mesh environment display. For instance, if the window region 112 includes the fields of vision of two static cameras suspended above the patient 110, the user of the remote MR device 106 is provided a live video feed of one of the two static cameras depending on which portion of the virtual display of the patient they are viewing. When the user turns their head or otherwise adjusts their field of vision to view another portion of the virtual display of the patient, the user is provided a live video feed of the other camera of the two static cameras based on the other camera capturing live video data of the corresponding portion of the patient 110.

Additionally, or alternatively, in some examples, the environment 108 includes one or more cameras that can be controlled by a user of the remote MR device 106, enabling the user to change the field of vision of the camera and thereby see a desired portion of the patient in their live video feed.

The data stream 114 is provided by the local MR device 102 to the remote MR device 106 via the network 104. In some examples, the data stream 114 includes the SR mesh data 116 and the video data 118.

The SR mesh data 116 includes optical data of the environment 108 and data indicative of the positions of surfaces in the environment based on that optical data. The extraction of 3D surface data of the environment from the optical data and generation of the SR mesh data 116 is performed using photogrammetry techniques. In some examples, the SR mesh data 116 includes data representing a mesh of points in 3D space of the environment, wherein the points and connections between the points represent the positions of surfaces in the environment. The positions of such points in 3D space are determined based on captured optical data such as depth information captured by depth sensors.

In some examples, the SR mesh data 116 is generated based on optical data captured from the environment by the local MR device 102 or other optical capture device(s). Further, in some examples, the SR mesh data 116 includes image data overlayed on the SR mesh. In such examples, the optical data captured from the environment is converted into images that are arranged in positions on the SR mesh such that the SR mesh provides a photographic appearance of each surface in the environment to a certain degree of accuracy.

The SR mesh data 116 is used by the remote MR device 106 to display the SR mesh environment display 120 to a user of the device 106. In some examples, the displayed SR mesh environment display 120 is a 3D virtual environment with a plurality of positioned surfaces to make the virtual environment appear substantially the same as the environment 108 of the local MR device 102.

In some examples, the optical data used to generate the SR mesh data 116 is captured during an initial time interval and the SR mesh data 116 is then generated and provided to the remote MR device 106. After the SR mesh data 116 is generated, the video data 118 of the live video feed begins to be captured and provided to the remote MR device 106. In such examples, the SR mesh data 116 remains static. Alternatively, the SR mesh data 116 is updated occasionally during the use of the live video feed to reflect any substantial changes in the environment 108 (e.g., if the patient 110 shifts positions, the SR mesh data 116 is updated and provided to the remote MR device 106 to update the SR mesh environment display 120).

The video data 118 of the data stream 114 includes video data of a live video feed or stream associated with the window region 112 as described herein. In some examples, the video data 118 is captured by an optical capture device of the local MR device 102 and/or the video data 118 includes video data of the field of vision of the user of the local MR device 102. Alternatively, or additionally, the video data 118 is captured by one or more optical capture devices that are separate from the local MR device 102 (e.g., static cameras located in various places in the environment 108).

Further, in some examples, the video data 118 and/or the data stream 114 includes 3D position data and/or other 3D metadata that can be used by the remote MR device 106 to provide a user of the device 106 with an appropriate field of vision with respect to the SR mesh environment display 120. Such position data and other metadata is used to synchronize the video data 118 with the SR mesh data 116 such that the live video feed is displayed to a user of device 106 in a location of the environment display 120 that matches the location of the region window 112 in the environment 108. As a result, the device 106 displays the environment display 120 and overlays the video data 118 of the live video feed on or at a window region 124 of the environment display 120. Thus, the live video feed appears to be occurring in reference to the surfaces of the environment display 120 (e.g., a live video feed of a surgery occurring in the patient 110's abdomen is displayed on a virtual representation of the patient mesh 122 in the window region 124 of the environment display 120).

The SR mesh environment display 120 is displayed to a user of the remote MR device 106 via a user interface thereof, such as goggles, glasses, a screen, or the like. The SR mesh environment display 120 includes a surface reconstruction of the surfaces of the environment 108, including the patient 110, based on the received SR mesh data 116. The virtual patient mesh 122 is displayed via the device 106 to a user in the form of a 3D SR mesh with images of the surfaces. The window region 124 displays the live video feed of the video data 118 in the equivalent location of the environment display 120 to the location of its capture in the window region 112 of environment 108.

In some examples, the window region 124 remains static based on the window region configuration and/or settings. If the video capture of window region 112 in the environment 108 is interrupted (e.g., a user of the local MR device 102 looks away from the window region 112 momentarily such that the capture device of the device 102 cannot capture video of the window region 112), the display of the video feed in window region 124 is paused and/or the lack of video feed is indicated to the user of the device 106 in another way (e.g., a warning is displayed, the video feed disappears from the window region 124 and is replaced by the SR mesh of the environment display 120).

Further, in some examples, the user of the remote MR device 106 is enabled to view different portions of the window region 124 through changes to field of vision with respect to the environment display 120. For instance, in an example, the user is enabled to view a different portion of the live video feed of the window region 124 by turning their head while wearing the device 106 as headgear. In such examples, the video data 118 includes video feeds from multiple optical capture devices of the environment 108, enabling a larger window region 124 to display live video feeds in the environment display 120.

The feedback data 126 is provided from the remote MR device 106 to the local MR device 102 via the network 104. In some examples, the feedback data 126 includes audio data 128 and/or virtual artifacts 130 and/or associated data. In some such examples, the audio data 128 includes verbal statements by a user of the remote MR device 106 to be played to a user of the local MR device 102. Further, the local MR device 102 enables a user to also send audio data from the device 102 to the remote MR device 106 to be played to the user of that device 106. Thus, the users of the devices 102 and 106 are enabled to speak to one another (e.g., the user of the device 106 can provide verbal guidance or ask questions of the user of the device 102, who is enabled to answer verbally).

Additionally, or alternatively, other types of audio data 128 are provided from the device 106 to the device 102 and/or vice versa. For instance, in some examples, audio alerts associated with the procedure being performed in the environment 108 are provided to the device 106 such that a user thereof can hear the alerts in real time.

In some examples, the user of the remote MR device 106 is enabled to create virtual artifacts and/or holograms for display in the 3D space of the SR mesh environment display 120 and/or to send the artifacts 130 to the local MR device 102 via the network 104 to be displayed to a user of the device 102. For instance, in some examples, the user of the device 106 draws arrows, circles, or otherwise highlights or indicates portions of the 3D space of the environment display 120. Those virtual artifacts are provided to the local MR device 102 where they are displayed to a user of the device 102 in the form of AR artifacts that are overlayed over the user's field of vision. The AR artifacts are positioned in the environment 108 in the equivalent positions as the virtual artifacts 130 occupy in the environment display 120. In an example, the user of device 106 wants to indicate a particular area in the window region 124, so the user creates an arrow pointing to that area and sends it to the local MR device 102. The local MR device 102 displays the arrow to the user of the device 102 such that it points to the equivalent area in the window region 112. Such artifacts can be used by the users of the system to enable more clear verbal communication.

Additionally, or alternatively, the virtual artifacts 130 include letters, words, numbers, or the like, enabling the user of the device 106 to not only indicate portions of the environment display 120, but also to label those portions or indicate other information in writing.

In some examples, the local MR device 102 also enables the user of the device 102 to send virtual artifacts to the remote MR device 106 for display to the user thereof. In such examples, the sent virtual artifacts operate in substantially the same manner as the virtual artifacts 130 sent from the remote MR device 106 to the local MR device 102 in the feedback data 126.

In some examples, in addition to the SR mesh data and the video data, other types of visual data are sent to the remote device 106 and/or displayed to the user of the local MR device 102. For instance, in some such examples, other medical scans of portions of a patient's body are displayed as overlays on the SR mesh representation of the patient (e.g., an X-ray scan of the patient's arm revealing a broken bone is overlayed on the SR mesh representation of the patient's arm, such that the location of the break in the bone can be easily located on the SR mesh representation. Such a scan display can be activated and deactivated by the user of the device as desired or necessary. Further, other types of scan data can also be displayed to users of the devices 102 and/or 106 to aid in performance and/or review of the procedures being done (e.g., a user of the device 106 is enabled to view a computerized tomography (CT) scan overlayed on the virtual patient mesh 122 and/or side-by-side to maintain a complete view of the virtual patient mesh 122 and be able to quickly reference the scan). Additionally, or alternatively, other types of media and/or other data are overlayed on the SR mesh or otherwise in the field of view of a user, such as documents, photos, additional video feeds, or the like.

In other examples, environments other than operating rooms or other medical settings are used without departing from the description. For instance, in an example, a mechanical device repair environment is optically captured, and a resulting data stream is provided to a remote device, enabling a user to view a 3D environment display of the environment as described herein. Alternatively, in an example, the described system is used to enable a teacher to teach students in a remote education setting. In other examples, other types of environments are used without departing from the description.

Figure 2:
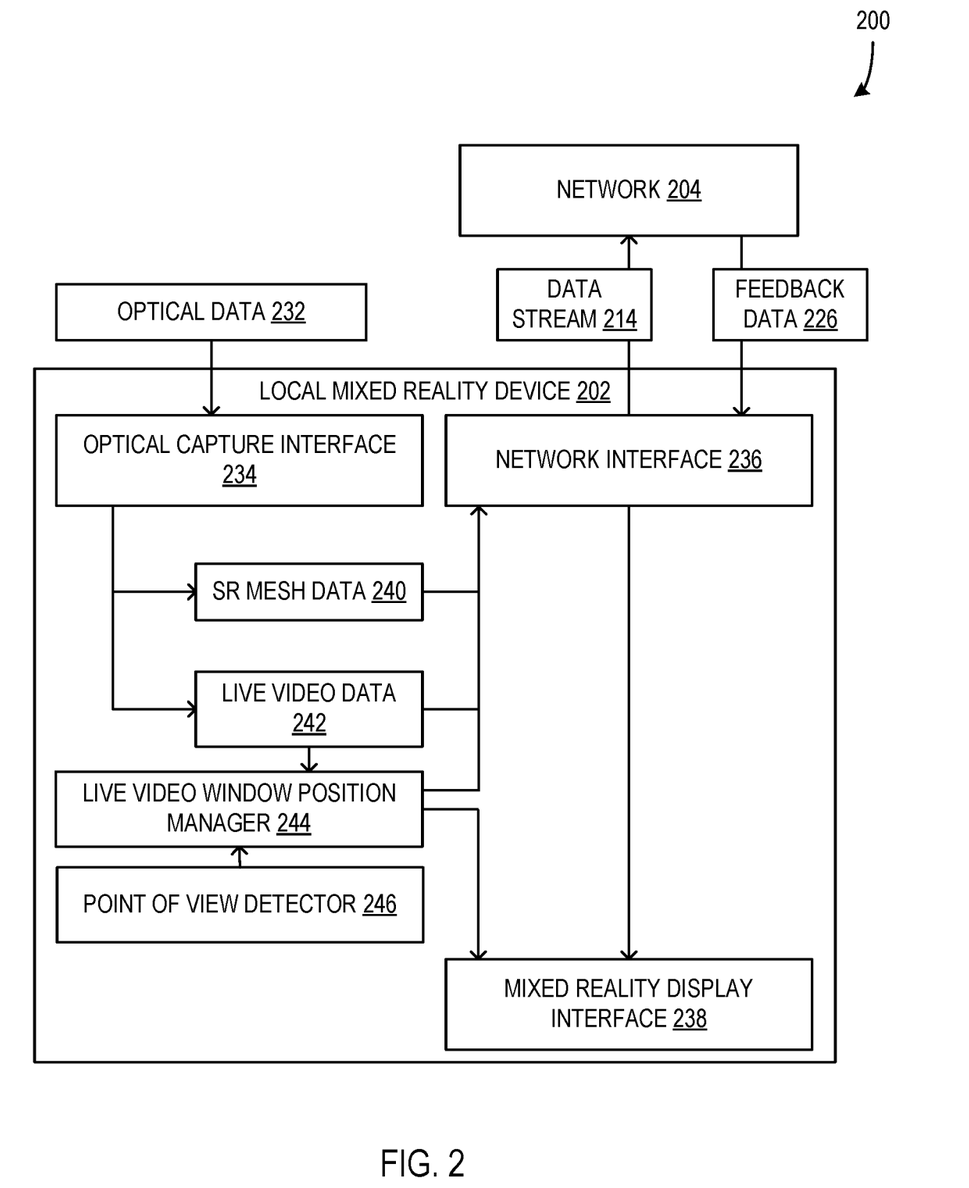
FIG. 2 is a block diagram illustrating a system including a local MR device.

FIG. 2 is a block diagram illustrating a system 200 including a local MR device 202. In some examples, the local MR device 202 is part of a system such as system 100 of FIG. 1 as described above. The local MR device 202 includes an optical capture interface 234 configured to capture optical data 232, a network interface 236 configured to communication via a network 204, and an MR display interface 238 configured to display artifacts or other information in virtual reality, augmented reality, and/or other mixed reality methods.

In some examples, the optical capture interface 234 includes hardware, firmware, and/or software for capturing optical data of an environment (e.g., a camera or the like). The optical data 232 includes the optical data that is used to generate the SR mesh data 240 of the SR mesh (e.g., the SR mesh data 116 of FIG. 1) and/or the live video data 242 (e.g., the video data 118 of FIG. 1).

Further, in some examples, the SR mesh data 240 and live video data 242 generated from the captured optical data 232 is provided to the network interface 236 to send it to a remote MR device (e.g., remote MR device 106 of FIG. 1) in a data stream 214 over the network 204 as described herein. Additionally, or alternatively, the live video data 242 is provided to a live video window position manager 244.

The live video window position manager 244 includes hardware, firmware, and/or software that is configured to store and maintain the position, boundaries, and/or other features of the live video window in the environment (e.g., window region 112 in the environment 108). In some examples, the manager 244 is configured to use data from a point of view detector 246 (e.g., a component configured to detect the current location and position of the device 202 and the field of vision being captured by the optical capture interface 234) and the live video data 242 to determine whether the live video data 242 includes optical data from within the stored live video window.

In some examples, the live video window position manager 244 filters optical data from the live video data 242 that includes portions of the environment that are not in the currently defined live video window. This filtering ensures that the live video data 242 sent to the remote MR device via the network 204 makes sense to a viewer that is expecting the live video data to be representative of the region in the defined live video window.

Further, in some examples, the live video window position manager 244 uses the data from the point of view detector 246 to case the MR display interface 238 to display indicators of the live video window relative to the current point of view being captured by the optical capture interface 234. Such indicators include lines or other shapes that indicate the boundaries and/or position of the live video window overlayed on the view of a user of the device 202 and/or notifications indicating how to change the position, location, or direction of the optical capture interface 234 to bring the live video window region into the field of view.

The point of view detector 246 includes hardware, firmware, and/or software configured to detect the current position, direction, and/or orientation of the device 202 and the associated optical capture interface 234, especially with respect to an environment such as environment 108 of FIG. 1. In some examples, the point of view detector 246 includes accelerometers and/or other similar measuring devices for detecting movement of the device 202 and that movement is used to determine the current position and orientation of the device 202 relative to an initial position and orientation of the device 202. Further, in some examples, during the initial capture of the optical data 232 to generate the SR mesh data 240, the point of view detector 246 is calibrated in an initial position and orientation with respect to the environment that is being captured, such that the position and orientation of the device 202 within that environment can be tracked while a user of the device 202 moves around within the environment as described herein. In some such examples, such calibration is performed at other times during operation of the device 202 without departing from the description.

In some examples, the local MR device 202 receives feedback data 226 from the network 204 via the network interface 236. Such feedback data 226 includes audio data and/or virtual artifacts as described above with respect to feedback data 126. In other examples, the feedback data 226 includes more, fewer, or different types of feedback data without departing from the description. Some or all the feedback data 226 that can be displayed visually is provided to the MR display interface 238 for display to a user of the device 202. Other feedback data 226 (e.g., audio data of a remote user's guidance or commentary) is provided to the user of the device 202 through other interfaces, stored by the device 202, and/or processed in some other way.

Further, in some examples, the local MR device 202 includes goggles, glasses, or another form of headgear, such that the MR display interface 238 includes a surface or surfaces that are held in front of a user's field of vision upon which the described information is displayed. In some such examples, the headgear further includes an audio speaker or speakers in the form of headphones or the like, and/or a microphone enabling a user of the device 202 to speak to a remote user as described herein.

Figure 3:
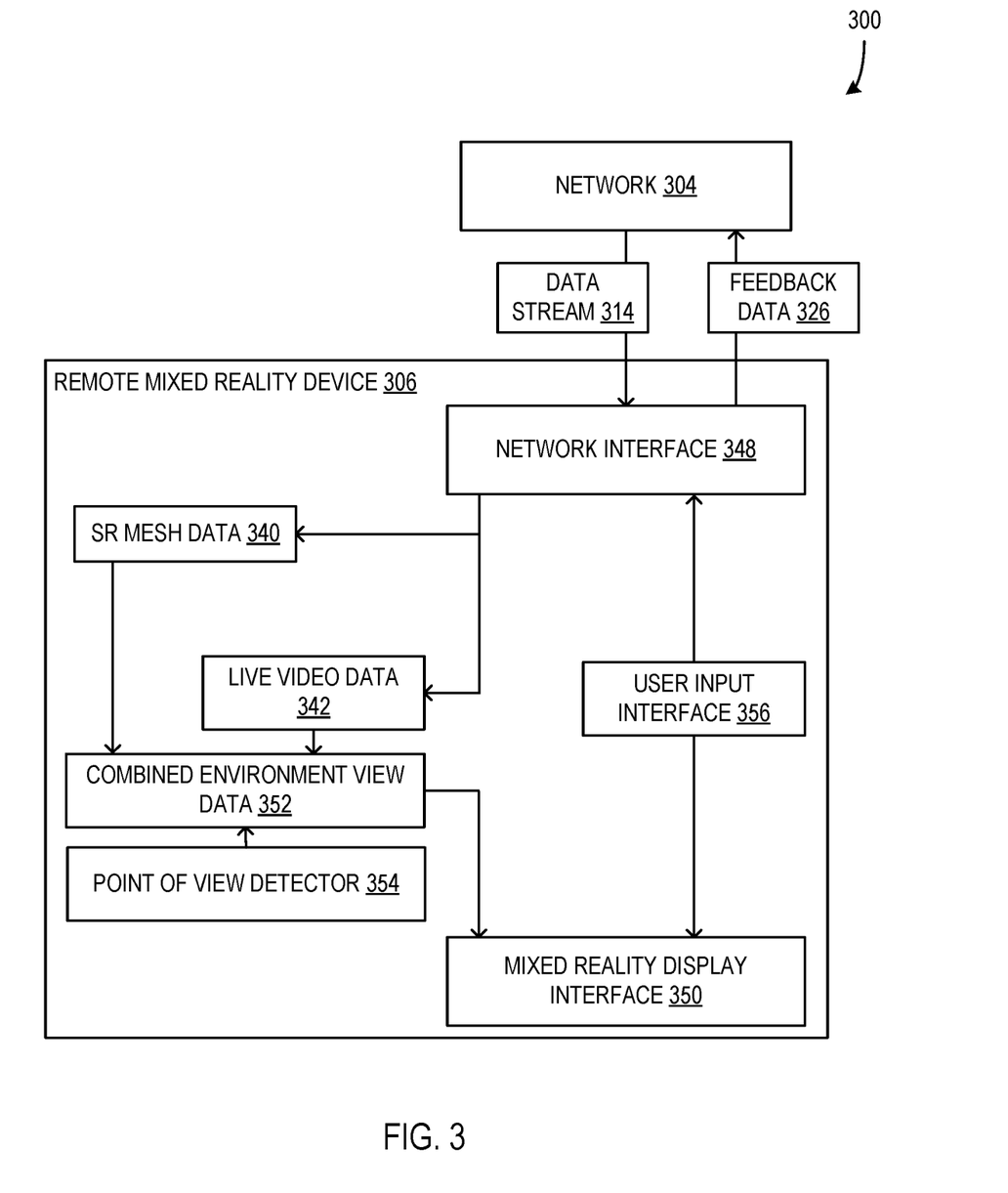
FIG. 3 is a block diagram illustrating a system including a remote MR device.

FIG. 3 is a block diagram illustrating a system 300 including a remote MR device 306. In some examples, the remote MR device 306 is part of a system such as system 100 of FIG. 1 as described above. The device 306 receives a data stream 314 from a network 304 via a network interface 348 and displays some or all data of the data stream 314 to a user via an MR display interface 350.

In some examples, the data stream 314 includes SR mesh data 340 and/or live video data 344 provided from a local MR device (e.g., local MR devices 102 and 202 as described herein). For instance, in some such examples, the SR mesh data 340 is provided during an initial stage of the process and then the live video data 342 is provided after the SR mesh data 340 is received and the remote MR device 306 is enabled to generate a virtual SR mesh environment as described herein. Additionally, or alternatively, SR mesh data 340 is provided occasionally during the streaming of the live video data 342 as well, enabling the remote MR device 306 to update the virtual SR mesh environment. Additionally, or alternatively, the data stream 314 includes other data, such as location data associated with the environment (e.g., window placement location data, camera location data, 3D coordinates associated with other objects in the environment).

Further, the SR mesh data 340 and the live video data 342 are combined into combined environment view data 352, which is then displayed to a user of the device 306 via the MR display interface 350. For instance, in some examples, the SR mesh data 340 is used to generate a virtual SR mesh environment (e.g., the SR mesh environment display 120 of FIG. 1) and the live video data 342 is used to display the live video of the window region in the generated virtual SR mesh environment (e.g., the window region 124 of FIG. 1).

In some examples, the point of view detector 354 is equivalent to the point of view detector 246 of FIG. 2. It is configured to detect the position and orientation of the remote MR device 306, including its position and orientation with respect to a generated virtual SR mesh environment. The position and orientation information provided by the point of view detector 354 is used in conjunction with the combined environment view data 352 to display a field of vision of the virtual SR mesh environment based on the position and orientation of the device 306. As the position and orientation of the device 306 changes (e.g., a user of a headset version of the device 306 turns their head), the displayed view is altered to correspond with the change in position and orientation (e.g., the displayed view simulates the turning of the field of vision within the virtual SR mesh environment.

In some examples, the remote MR device 306 includes a user input interface 356. The user input interface 356 includes hardware, firmware, and/or software that enables a user of the device 306 to generate user input data and send that user input data as feedback data 326 to a local MR device over the network 304 via the network interface 348. For instance, in some examples, the user input interface 356 includes an interface that enables a user of the device 306 to draw or otherwise create virtual artifacts in the virtual SR mesh environment. Such virtual artifacts (e.g., arrows, boxes, circles, or other shapes) are displayed to the user of the device 306 via the MR display interface 350 and sent as feedback data 326 to a user of a local MR device over the network 304 as described herein.

Additionally, or alternatively, the user input interface 356 includes a microphone or other audio capture interface that enables a user of the device 306 to capture speech or other audio data to be sent as feedback data 326 to the local MR device as described herein.

Figure 4:
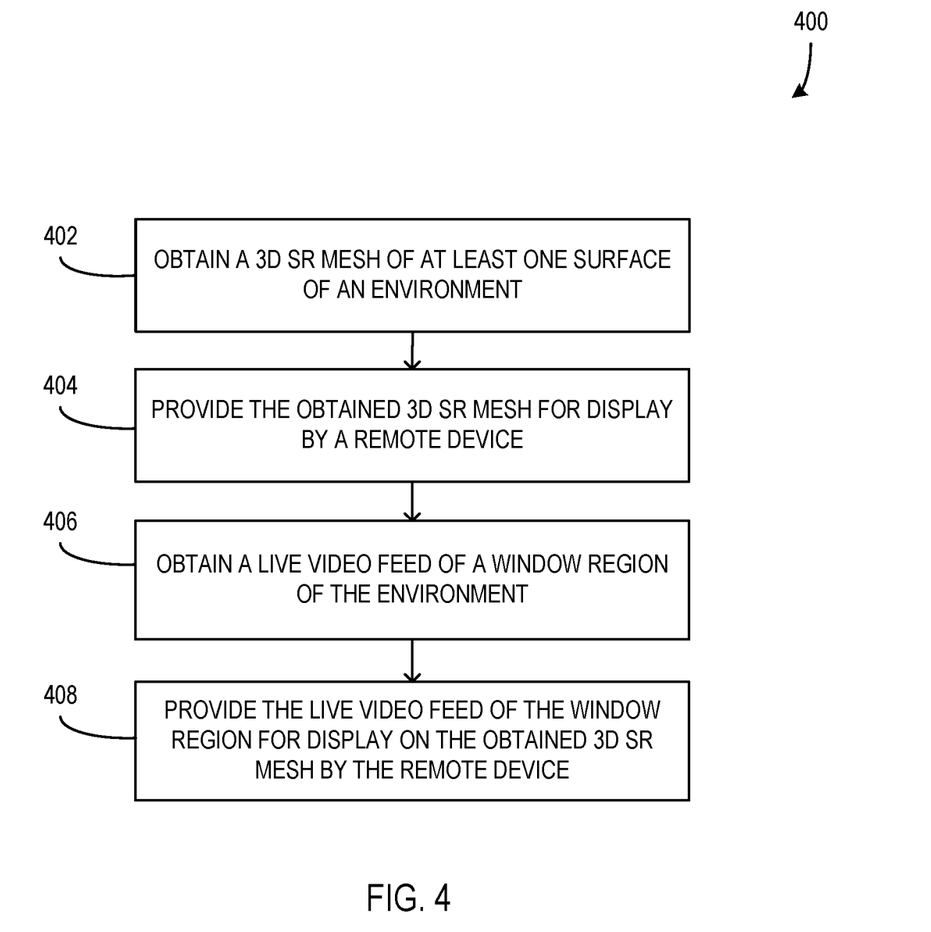
FIG. 4 is a flowchart illustrating a computerized method for providing combined SR mesh data and live video data to a remote device to enable the remote device to display an MR environment.

FIG. 4 is a flowchart illustrating a computerized method 400 for providing combined SR mesh data (e.g., SR mesh data 116) and live video data (e.g., video data 118) to a remote device (e.g., remote MR device 106) to enable the remote device to display an MR environment (e.g., SR mesh environment display 120). In some examples, the computerized method 400 is executed or otherwise performed in a system such as system 100 of FIG. 1. In some such examples, the computerized method 400 is executed on a local MR device such as local MR device 102.

At 402, a 3D SR mesh of a surface of an environment is obtained. In some examples, obtaining the 3D SR mesh of the surface includes obtaining the 3D SR mesh from an optical capture device or other device that is separate from the local MR device that is performing the method 400. Alternatively, or additionally, obtaining the 3D SR mesh includes obtaining optical data an optical capture component of the local MR device and generating the 3D SR mesh from the obtained optical data (e.g., 502-504 of method 500 in FIG. 5).

In some examples, the 3D SR mesh includes a series of points positioned in 3D space that are connected to each other in such a way as to represent the 3D surfaces of the environment. In some such examples, the represented surfaces include image data captured from the equivalent surfaces in the environment using photogrammetry techniques, such that the virtual surfaces in the 3D SR mesh can be displayed with an appearance equivalent to the surfaces of the environment.

At 404, the obtained 3D SR mesh is provided for display by a remote device. In some examples, the obtained 3D SR mesh is provided to the remote device (e.g., the remote MR device 106) via a network (e.g., network 104) using a data stream (e.g., data stream 114). Further, in some examples, the 3D SR mesh is received by the remote MR device and the remote MR device generates a 3D SR mesh environment display using the 3D SR mesh as described herein.

At 406, a live video feed of a window region of the environment is obtained by the local MR device. In some examples, the live video feed is captured by the local MR device using a camera or other optical capture component. In such examples, the live video feed includes video data of a field of vision of the user of the local MR device. For instance, the local MR device includes headgear and a camera that captures video data of an area in front of the user.

Further, in some examples, the live video feed includes video data associated with the specific window region of the environment as described herein.

At 408, the live video feed of the window region is provided for display on the 3D SR mesh by the remote device. In some examples, the remote MR device receives the live video feed and displays it in an equivalent window region with respect to the 3D SR mesh environment display as described herein.

Figure 5:
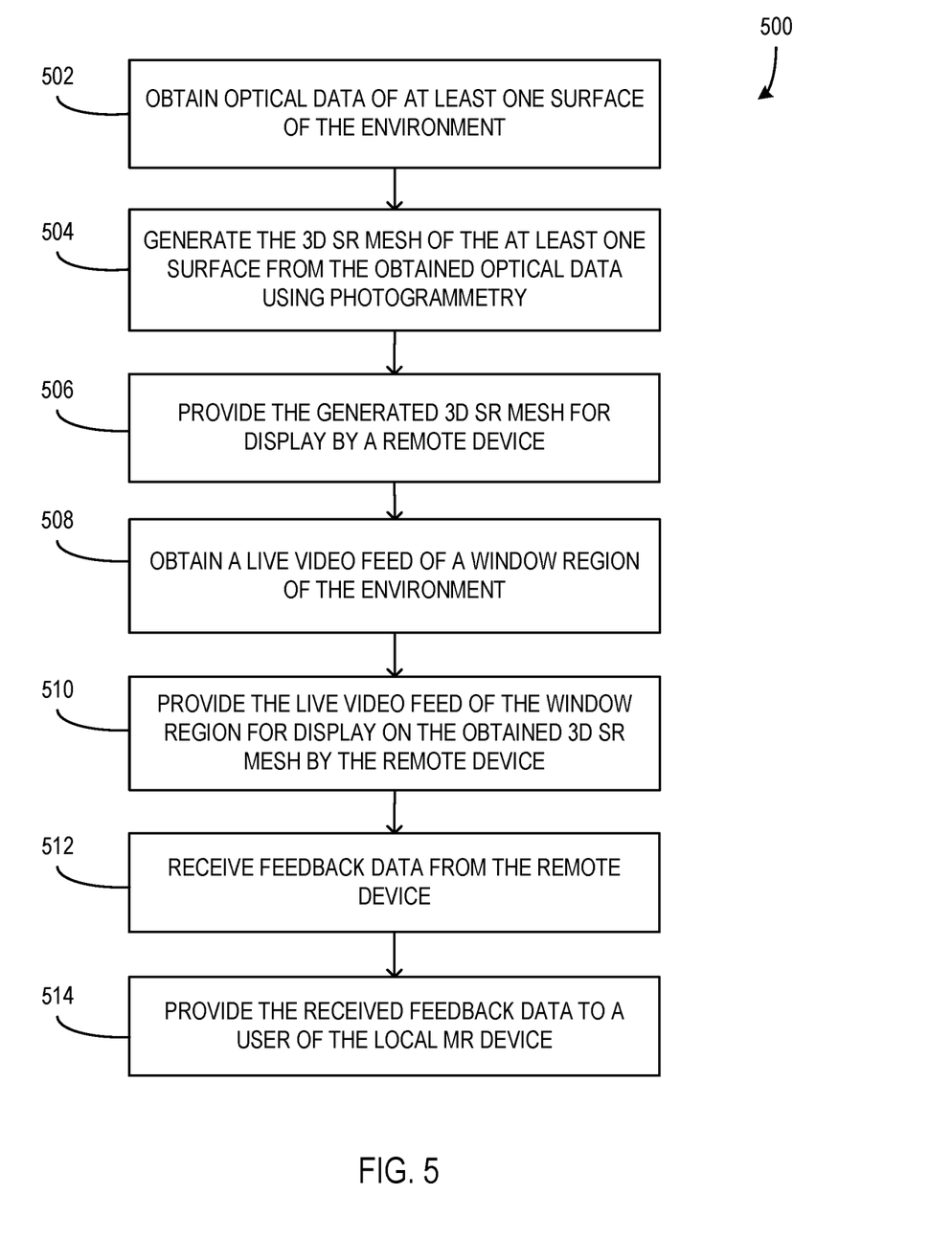
FIG. 5 is a flowchart illustrating a computerized method for providing combined SR mesh data and live video data to a remote device to enable the remote device to display an MR environment and receiving feedback data from the remote device based on the provided SR mesh data and live video data.

FIG. 5 is a flowchart illustrating a computerized method 500 for providing combined SR mesh data (e.g., SR mesh data 116) and live video data (e.g., video data 118) to a remote device (e.g., remote MR device 106) to enable the remote device to display an MR environment (e.g., SR mesh environment display 120) and receiving feedback data (e.g., feedback data 126) from the remote device based on the provided SR mesh data and live video data. In some examples, the computerized method 500 is executed or otherwise performed in a system such as system 100 of FIG. 1. In some such examples, the computerized method 500 is executed on a local MR device such as local MR device 102.

At 502, optical data of a surface of the environment is obtained by the local MR device and, at 504, the 3D SR mesh of the surface is generated from the obtained optical data using photogrammetry as described herein.

At 506, the generated 3D SR mesh is provided for display by a remote device. At 508, a live video feed of a window region of the environment is obtained and, at 510, the live video feed of the window region is provided for display on the 3D SR mesh by the remote device. In some examples, 506-510 is performed in substantially the same manner as 404-408 of method 400 as described above.

At 512, feedback data is received from the remote device. In some examples, the feedback data includes audio data (e.g., audio data 128) and/or virtual artifacts (e.g., virtual artifacts 130). In some such examples, the received audio data includes speech of a user of the remote device and, further, the user of the local device is enabled to send speech-based audio data by which to communicate back and forth with the user of the remote device.

In some examples, the feedback data includes virtual artifacts that are generated or otherwise created at the remote device and sent over the network to the local device. Such virtual artifacts include lines, arrows, shapes, letters, numbers, and/or other types of artifacts as described herein.

At 514, the received feedback data is provided to the user of the local MR device. In some examples, this includes playing audio data to the user and/or displaying virtual artifacts to the user via the MR interfaces of the local MR device. In such examples, displaying the virtual artifacts includes displaying the virtual artifacts in 3D space of the environment such that the virtual artifacts appear to be in the equivalent position as they do with respect to the remote device and the virtual environment displayed therewith, as described herein.

In some examples, the method 500 further includes displaying the position of the window region associated with the live video feed to the user of the local MR device via a visual interface of the local MR device. For instance, the window region is indicated using holographic lines or shapes overlayed on the field of vision of the user of the device, as described herein.

Further, in some examples, obtaining the live video feed of the window region includes obtaining a live video feed from at least one local optical capture device that is separate from the local MR device. Additionally, in some such examples, the live video feed includes multiple live video feeds from a plurality of local optical capture devices that are combined into an aggregated live video feed associated with the window region, such that the window region includes a field of view of each of the plurality of local optical capture devices.

In some examples, the method 500 further includes receiving window region adjustment instructions from a user interface of the local MR device. The instructions are used to adjust at least one of a size and a position of the window region on the local MR device. In some examples, such adjustments are displayed to the user via holographic artifacts as described herein. Further, the instructions are provided to the remote device, whereby the remote device is enabled to synchronize a window region with the adjusted window region of the local MR device. In other examples, a user of the remote device is enabled to use such instructions to adjust the window region of the remote device and then synchronize the window region of the local device with the newly adjusted window region.

Exemplary Operating Environment

Figure 6:
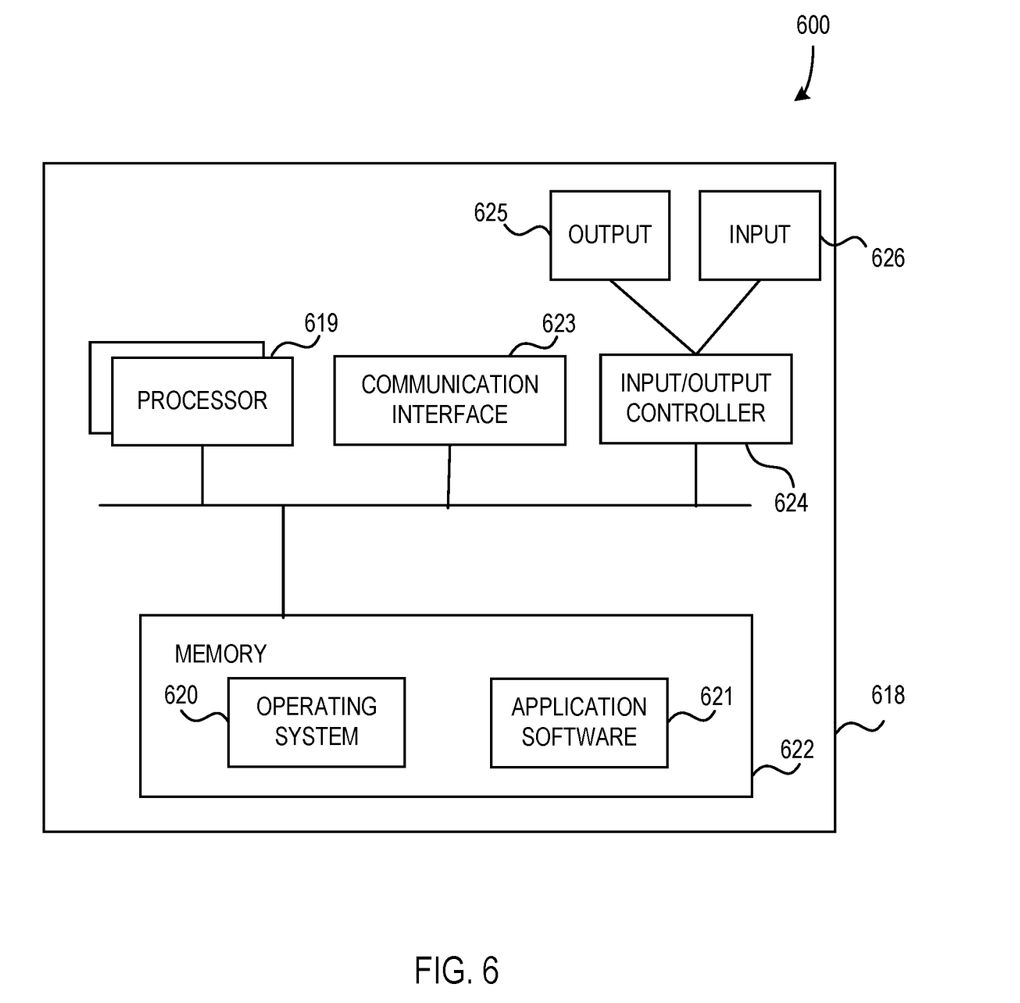
FIG. 6 is a diagram illustrating an example implementation of parallel cardinality processing.

The present disclosure is operable with a computing apparatus according to an embodiment as a functional block diagram 600 in FIG. 6. In an example, components of a computing apparatus 618 are implemented as a part of an electronic device according to one or more embodiments described in this specification. The computing apparatus 618 comprises one or more processors 619 which may be microprocessors, controllers, or any other suitable type of processors for processing computer executable instructions to control the operation of the electronic device. Alternatively, or in addition, the processor 619 is any technology capable of executing logic or instructions, such as a hard-coded machine. In some examples, platform software comprising an operating system 620 or any other suitable platform software is provided on the apparatus 618 to enable application software 621 to be executed on the device. In some examples, capturing optical data of an environment using a local MR device and providing SR mesh data and live video data based on the optical data to a remote MR device for use in generating a virtual environment display as described herein is accomplished by software, hardware, and/or firmware.

In some examples, computer executable instructions are provided using any computer-readable media that are accessible by the computing apparatus 618. Computer-readable media include, for example, computer storage media such as a memory 622 and communications media. Computer storage media, such as a memory 622, include volatile and non-volatile, removable, and non-removable media implemented in any method or technology for storage of information such as computer readable instructions, data structures, program modules or the like. Computer storage media include, but are not limited to, Random Access Memory (RAM), Read-Only Memory (ROM), Erasable Programmable Read-Only Memory (EPROM), Electrically Erasable Programmable Read-Only Memory (EEPROM), persistent memory, phase change memory, flash memory or other memory technology, Compact Disk Read-Only Memory (CD-ROM), digital versatile disks (DVD) or other optical storage, magnetic cassettes, magnetic tape, magnetic disk storage, shingled disk storage or other magnetic storage devices, or any other non-transmission medium that can be used to store information for access by a computing apparatus. In contrast, communication media may embody computer readable instructions, data structures, program modules, or the like in a modulated data signal, such as a carrier wave, or other transport mechanism. As defined herein, computer storage media do not include communication media. Therefore, a computer storage medium should not be interpreted to be a propagating signal per se. Propagated signals per se are not examples of computer storage media. Although the computer storage medium (the memory 622) is shown within the computing apparatus 618, it will be appreciated by a person skilled in the art, that, in some examples, the storage is distributed or located remotely and accessed via a network or other communication link (e.g., using a communication interface 623).

Further, in some examples, the computing apparatus 618 comprises an input/output controller 624 configured to output information to one or more output devices 625, for example a display or a speaker, which are separate from or integral to the electronic device. Additionally, or alternatively, the input/output controller 624 is configured to receive and process an input from one or more input devices 626, for example, a keyboard, a microphone, or a touchpad. In one example, the output device 625 also acts as the input device. An example of such a device is a touch sensitive display. The input/output controller 624 may also output data to devices other than the output device, e.g., a locally connected printing device. In some examples, a user provides input to the input device(s) 626 and/or receives output from the output device(s) 625.

The functionality described herein can be performed, at least in part, by one or more hardware logic components. According to an embodiment, the computing apparatus 618 is configured by the program code when executed by the processor 619 to execute the embodiments of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Program-specific Standard Products (ASSPs), System-on-a-chip systems (SOCs), Complex Programmable Logic Devices (CPLDs), Graphics Processing Units (GPUs).

At least a portion of the functionality of the various elements in the figures may be performed by other elements in the figures, or an entity (e.g., processor, web service, server, application program, computing device) not shown in the figures.

Although described in connection with an exemplary computing system environment, examples of the disclosure are capable of implementation with numerous other general purpose or special purpose computing system environments, configurations, or devices.

Examples of well-known computing systems, environments, and/or configurations that are suitable for use with aspects of the disclosure include, but are not limited to, mobile or portable computing devices (e.g., smartphones), personal computers, server computers, hand-held (e.g., tablet) or laptop devices, multiprocessor systems, gaming consoles or controllers, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. In general, the disclosure is operable with any device with processing capability such that it can execute instructions such as those described herein. Such systems or devices accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions, or the specific components or modules illustrated in the figures and described herein. Other examples of the disclosure include different computer-executable instructions or components having more or less functionality than illustrated and described herein.

In examples involving a general-purpose computer, aspects of the disclosure transform the general-purpose computer into a special-purpose computing device when configured to execute the instructions described herein.

An example system comprises: a processor of a local mixed reality (MR) device; and a memory comprising computer program code, the memory and the computer program code configured to, with the processor, cause the processor to: obtain optical data of a surface of an environment; generate a three-dimensional (3D) surface reconstruction mesh of the surface from the obtained optical data using photogrammetry; provide the generated 3D surface reconstruction mesh for display by a remote device; obtain a live video feed of a window region of the environment; and provide the live video feed of the window region for display on the generated 3D surface reconstruction mesh by the remote device.

An example computerized method comprises: obtaining, by a local mixed reality (MR) device, a three-dimensional (3D) surface reconstruction mesh of a surface of an environment; providing the obtained 3D surface reconstruction mesh for display by a remote device; obtaining a live video feed of a window region of the environment; and providing the live video feed of the window region for display on the obtained 3D surface reconstruction mesh by the remote device.

One or more computer storage media having computer-executable instructions that, upon execution by a processor, cause the processor to at least: obtain optical data of a surface of an environment using a local mixed reality (MR) device; generate a three-dimensional (3D) surface reconstruction mesh of the surface from the obtained optical data; provide the generated 3D surface reconstruction mesh for display by a remote device; obtain a live video feed of a window region of the environment; and provide the live video feed of the window region for display on the generated 3D surface reconstruction mesh by the remote device.

Alternatively, or in addition to the other examples described herein, examples include any combination of the following:

further comprising: obtaining feedback data from the remote device, wherein the feedback data includes at least one of the following: audio data and virtual artifact data; and providing the obtained feedback data to a user of the local MR device, wherein audio data of the obtained feedback data is played for the user and virtual artifact data of the obtained feedback data is displayed to the user via a visual interface of the local MR device.

further comprising: displaying a position of the window region associated with the live video feed to a user of the local MR device via a visual interface of the local MR device.

wherein obtaining the 3D surface reconstruction mesh of a surface of the environment includes obtaining the 3D surface reconstruction mesh from another optical capture device; and wherein obtaining the live video feed of the window region includes capturing the live video feed of the window region using the optical capture interface of the local MR device.

wherein obtaining the live video feed of the window region includes obtaining a live video feed from a local optical capture device that is separate from the local MR device.

wherein obtaining the live video feed of the window region includes obtaining multiple live video feeds from a plurality of local optical capture devices; and combining the obtained multiple live video feeds into an aggregated live video feed associated with the window region, such that the window region includes a field of view of each of the plurality of local optical capture devices.

further comprising: receiving window region adjustment instructions from a user interface of the local MR device; adjusting at least one of a size and a position of the window region based on the received window region adjustment instructions; and providing the window region adjustment instructions to the remote device, whereby the remote device is enables to synchronize a window region with the adjusted window region of the local MR device.

Any range or device value given herein may be extended or altered without losing the effect sought, as will be apparent to the skilled person.

Examples have been described with reference to data monitored and/or collected from the users (e.g., user identity data with respect to profiles). In some examples, notice is provided to the users of the collection of the data (e.g., via a dialog box or preference setting) and users are given the opportunity to give or deny consent for the monitoring and/or collection. The consent takes the form of opt-in consent or opt-out consent.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The embodiments illustrated and described herein as well as embodiments not specifically described herein but within the scope of aspects of the claims constitute an exemplary means for obtaining, by a local mixed reality (MR) device, a three-dimensional (3D) surface reconstruction mesh of a surface of an environment; exemplary means for providing the obtained 3D surface reconstruction mesh for display by a remote device; exemplary means for obtaining a live video feed of a window region of the environment; and exemplary means for providing the live video feed of the window region for display on the obtained 3D surface reconstruction mesh by the remote device.

The term "comprising" is used in this specification to mean including the feature(s) or act(s) followed thereafter, without excluding the presence of one or more additional features or acts.

In some examples, the operations illustrated in the figures are implemented as software instructions encoded on a computer readable medium, in hardware programmed or designed to perform the operations, or both. For example, aspects of the disclosure are implemented as a system on a chip or other circuitry including a plurality of interconnected, electrically conductive elements.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of" The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A system comprising:
a processor of a local mixed reality (MR) device; and
a memory comprising computer program code, the memory and the computer program code configured to, with the processor, cause the processor to:
obtain optical data of a surface of an environment;
generate a three-dimensional (3D) surface reconstruction mesh of the surface from the obtained optical data using photogrammetry;
provide the generated 3D surface reconstruction mesh for display by a remote device; obtain a live video feed of a window region of the environment; and
provide the live video feed of the window region for display on the generated 3D surface reconstruction mesh by the remote device.

2. The system of claim 1, wherein the memory and the computer program code are configured to, with the processor, further cause the processor to:
obtain feedback data from the remote device, wherein the feedback data includes at least one of the following: audio data and virtual artifact data; and
provide the obtained feedback data to a user of the local MR device, wherein audio data of the obtained feedback data is played for the user and virtual artifact data of the obtained feedback data is displayed to the user via a visual interface of the local MR device.

3. The system of claim 1, wherein the memory and the computer program code are configured to, with the processor, further cause the processor to:
display a position of the window region associated with the live video feed to a user of the local MR device via a visual interface of the local MR device.

4. The system of claim 1, wherein obtaining the optical data of the surface includes capturing the optical data of the surface using an optical capture interface of the local MR device; and
wherein obtaining the live video feed of the window region includes capturing the live video feed of the window region using the optical capture interface of the local MR device.

5. The system of claim 4, wherein obtaining the live video feed of the window region includes obtaining a live video feed from a local optical capture device that is separate from the local MR device.

6. The system of claim 5, wherein obtaining the live video feed of the window region includes obtaining multiple live video feeds from a plurality of local optical capture devices; and
combining the obtained multiple live video feeds into an aggregated live video feed associated with the window region, such that the window region includes a field of view of each of the plurality of local optical capture devices.

7. The system of claim 1, wherein the memory and the computer program code are configured to, with the processor, further cause the processor to:
receive window region adjustment instructions from a user interface of the local MR device;
adjust at least one of a size and a position of the window region based on the received window region adjustment instructions; and
provide the window region adjustment instructions to the remote device, whereby the remote device is enabled to synchronize a window region with the adjusted window region of the local MR device.

8. A computerized method comprising:
obtaining, by a local mixed reality (MR) device, a three-dimensional (3D) surface reconstruction mesh of a surface of an environment;
providing the obtained 3D surface reconstruction mesh for display by a remote device;
obtaining a live video feed of a window region of the environment; and
providing the live video feed of the window region for display on the obtained 3D surface reconstruction mesh by the remote device.

9. The computerized method of claim 8, further comprising:
obtaining feedback data from the remote device, wherein the feedback data includes at least one of the following: audio data and virtual artifact data; and
providing the obtained feedback data to a user of the local MR device, wherein audio data of the obtained feedback data is played for the user and virtual artifact data of the obtained feedback data is displayed to the user via a visual interface of the local MR device.

10. The computerized method of claim 8, further comprising:
displaying a position of the window region associated with the live video feed to a user of the local MR device via a visual interface of the local MR device.

11. The computerized method of claim 8, wherein obtaining the 3D surface reconstruction mesh of a surface of the environment includes obtaining the 3D surface reconstruction mesh from another optical capture device; and
wherein obtaining the live video feed of the window region includes capturing the live video feed of the window region using the optical capture interface of the local MR device.

12. The computerized method of claim 11, wherein obtaining the live video feed of the window region includes obtaining a live video feed from a local optical capture device that is separate from the local MR device.

13. The computerized method of claim 12, wherein obtaining the live video feed of the window region includes obtaining multiple live video feeds from a plurality of local optical capture devices; and
combining the obtained multiple live video feeds into an aggregated live video feed associated with the window region, such that the window region includes a field of view of each of the plurality of local optical capture devices.

14. The computerized method of claim 8, further comprising:
receiving window region adjustment instructions from a user interface of the local MR device;
adjusting at least one of a size and a position of the window region based on the received window region adjustment instructions; and providing the window region adjustment instructions to the remote device, whereby the remote device is enabled to synchronize a window region with the adjusted window region of the local MR device.

15. One or more non-transitory computer storage media having computer-executable instructions that, upon execution by a processor, cause the processor to at least:
obtain optical data of a surface of an environment using a local mixed reality (MR) device;
generate a three-dimensional (3D) surface reconstruction mesh of the surface from the obtained optical data;
provide the generated 3D surface reconstruction mesh for display by a remote device;
obtain a live video feed of a window region of the environment; and
provide the live video feed of the window region for display on the generated 3D surface reconstruction mesh by the remote device.

16. The one or more non-transitory computer storage media of claim 15, wherein the computer-executable instructions, upon execution by the processor, further cause the processor to at least:
obtain feedback data from the remote device, wherein the feedback data includes at least one of the following: audio data and virtual artifact data; and
provide the obtained feedback data to a user of the local MR device, wherein audio data of the obtained feedback data is played for the user and virtual artifact data of the obtained feedback data is displayed to the user via a visual interface of the local MR device.

17. The one or more non-transitory computer storage media of claim 15, wherein the computer-executable instructions, upon execution by the processor, further cause the processor to at least:
display a position of the window region associated with the live video feed to a user of the local MR device via a visual interface of the local MR device.

18. The one or more non-transitory computer storage media of claim 15, wherein obtaining the optical data of the surface includes capturing the optical data of the surface using an optical capture interface of the local MR device; and
wherein obtaining the live video feed of the window region includes capturing the live video feed of the window region using the optical capture interface of the local MR device.

19. The one or more non-transitory computer storage media of claim 18, wherein obtaining the live video feed of the window region includes obtaining a live video feed from a local optical capture device that is separate from the local MR device.

20. The one or more non-transitory computer storage media of claim 19, wherein obtaining the live video feed of the window region includes obtaining multiple live video feeds from a plurality of local optical capture devices; and
combining the obtained multiple live video feeds into an aggregated live video feed associated with the window region, such that the window region includes a field of view of each of the plurality of local optical capture devices.

\* \* \* \* \*